United States Patent
Mink

[11] 3,958,457
[45] May 25, 1976

[54] ELECTRONICALLY OPERATED TIPPING-BUCKET RAIN GAUGE

[75] Inventor: James W. Mink, Colts Neck, N.J.

[73] Assignee: The United States of America as represented by the Secretary of the Army, Washington, D.C.

[22] Filed: Sept. 26, 1975

[21] Appl. No.: 617,212

[52] U.S. Cl. .............................................. 73/171
[51] Int. Cl.² ........................................ G01W 1/14
[58] Field of Search ............. 73/171, 217, 218, 424

[56] References Cited
UNITED STATES PATENTS

| | | | |
|---|---|---|---|
| 1,373,049 | 3/1921 | Boettcher | 73/218 |
| 1,381,864 | 6/1921 | Evans et al. | 73/217 |
| 3,127,769 | 4/1964 | Stucky et al. | 73/171 |
| 3,705,533 | 12/1972 | Kahl et al. | 73/171 |
| 3,721,122 | 3/1973 | Lucas | 73/171 |

FOREIGN PATENTS OR APPLICATIONS

| | | | |
|---|---|---|---|
| 1,448,122 | 6/1966 | France | 73/424 |

Primary Examiner—Richard C. Queisser
Assistant Examiner—John P. Beauchamp
Attorney, Agent, or Firm—Nathan Edelberg; Robert P. Gibson; Frank Dynda

[57] ABSTRACT

A rotary bucket wheel is positioned beneath and communicates with a water column of collected rain. When the water column exceeds a certain height, as determined by an electronic probe circuit, the bucket wheel is actuated whereby a predetermined volume of water is removed from the bottom of the water column.

11 Claims, 3 Drawing Figures

U.S. Patent    May 25, 1976    3,958,457
FIG.1
FIG.2
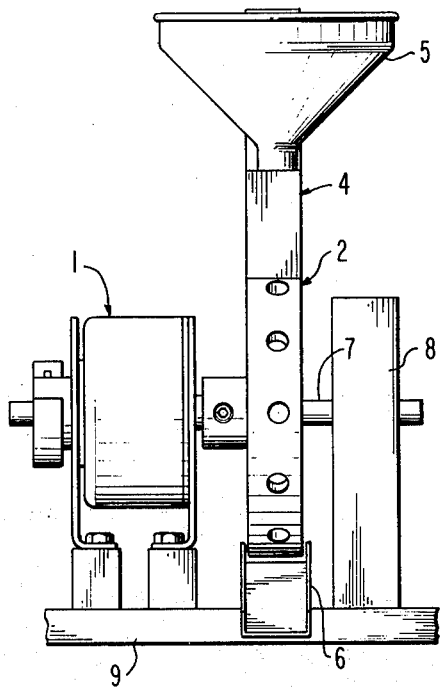
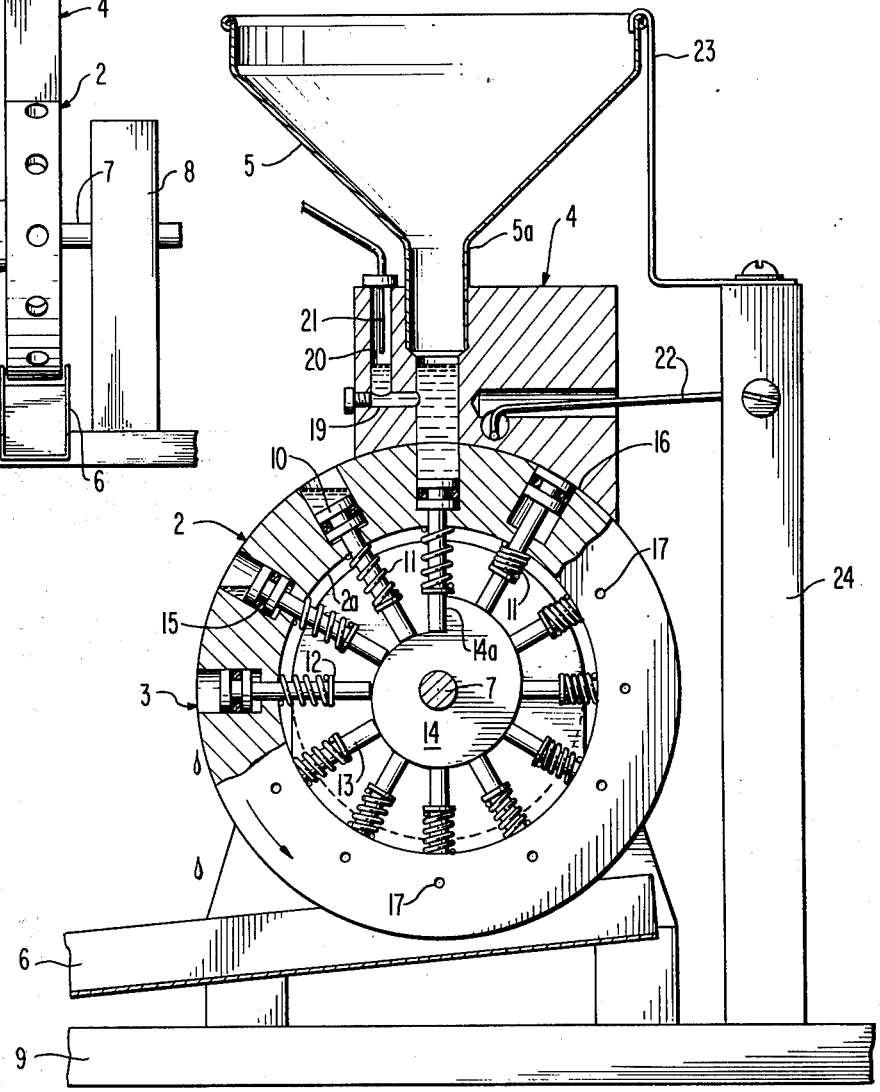
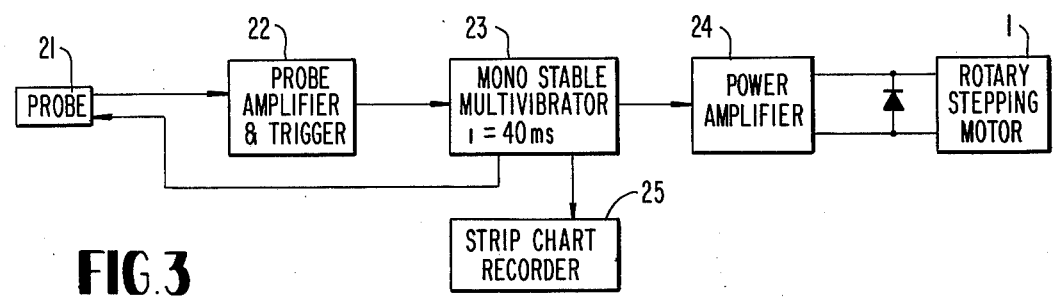
FIG.3

ELECTRONICALLY OPERATED TIPPING-BUCKET RAIN GAUGE

The invention described herein may be manufactured and used by or for the Government for governmental purposes without the payment of any royalties thereon or therefor.

BACKGROUND OF THE INVENTION

1. Field of the Invention

This invention relates to rain gauges and more particularly to a gauge for measuring low-to-moderate rainfall rates wherein incremental volumes of rain water are removed from the bottom of a column of the collected rain water, whereby the rainfall rate is calculated by determining the number of increments of rain water removed from the column during a period of time.

2. Description of the Prior Art

Various techniques have been employed for measuring rainfall rates, such as, measuring the flow of water between capacitor plates; measuring the momentum of drops formed from the collected rain and allowed to fall a fixed distance; or measuring the water accumulation with a commercially available tipping-bucket rain gauge. While these gauges have been satisfactory for their intended purposes, they have not been found satisfactory for the measurement of low-to-moderate rainfall rates; for instance, in the order of 0.3 to 30 mm/h. In the case of the commercially available tipping-bucket rain gauge, a two-compartment tipping-bucket arrangement is utilized which tips when a certain quantity of water, usually 8.1 ml, has accumulated in one compartment, thereby emptying that compartment and exposing the other compartment for filling. Because of the relatively large quantity of water required to tip such a bucket arrangement, the best resolution obtainable is in increments of 0.25 mm of rainfall.

SUMMARY

To overcome the disadvantages of hitherto employed rain gauges for the measurement of low-to-moderate rainfall rates, the rain gauge of the present invention has been advised which comprises, essentially, a rotary bucket wheel positioned beneath and communicating with a water column of collected rain. When the water column exceeds a certain height, as determined by an electronic probe circuit, the bucket wheel is actuated whereby a predetermined volume of water, for instance 0.1 ml, is removed from the bottom of the water column. By the construction and arrangement of the rain gauge, rainfall can be measured in increments of 0.005 mm.

BRIEF DESCRIPTION OF THE DRAWINGS

FIG. 1 is an end elevational view of the rain gauge of the present invention;

FIG. 2 is an enlarged, side elevational view, partly in section, of the rain gauge of the present invention; and FIG. 3 is a block diagram of the electronic probe circuit employed in the rain gauge of the present invention.

DESCRIPTION OF THE PREFERRED EMBODIMENT

Referring to the drawings and more particularly to FIG. 1 thereof, the rain gauge of the present invention comprises a rotary stepping motor 1 connected to a wheel 2 having buckets 3 provided in the peripheral surface thereof, the wheel being positioned beneath a water-channeling block 4 through which collected rain water is conducted from a funnel 5 to the buckets. The collected water is sequentially discharged from each bucket to a trough 6 positioned beneath the wheel during rotation of the bucket wheel, to be described more fully hereinafter.

A fixed cam shaft 7 is connected to a suitable support block 8 which, together with the trough 6 and stepping motor 1, are mounted on a suitable base 9.

The details of the construction of the bucket wheel 2 and water-channeling block 4 are shown in FIG. 2 wherein it will be seen that the buckets 3 consist of a plurality of radially extending cylinders, each having a piston 10 slidably mounted therein and biased radially inwardly by a spring 11 mounted between the inner peripheral surface 2a of the ring and a collar 12 secured to the piston rod 13. The springs 11 bias the inner end of each piston rod against the peripheral edge of a cam 14 fixedly secured to the shaft 7. The development of the cam 14 is such that as the bucket wheel is rotated counter-clockwise each piston is progressively urged radially outwardly to the outer end of its respective cylinder until the spring is fully compressed. After one revolution of the wheel, the respective piston rod arrives at the stepped portion 14a of the cam whereupon the biasing force of the spring moves the piston rod radially inwardly until the piston once again is positioned at the bottom or inner end of the cylinder. The volume of each cylinder is only 0.1 ml; thus, by the construction and arrangement of the cam-actuated, spring-biased pistons, surface tension, which causes a problem when filling a small volume with water, is eliminated.

The pistons are provided with O-rings 15 to prevent leakage of water along the piston rods and a thin layer of oil is applied to the peripheral surface of the bucket wheel, as at 16, for lubrication and to prevent water leakage between the wheel and the water-channeling block 4. The side wall at the lower end of each cylinder is provided with a vent opening 17 to facilitate the sliding movement of the piston within its respective cylinder.

The water-channeling block 4 is provided with a main bore 18 communicating at the upper end thereof with the discharge end 5a of the funnel, the lower end of the main bore communicating with the upper end of each cylinder or bucket in the wheel 2. A laterally extending bore 19 is formed in the block 4 and communicates between the main bore and a recess or pocket 20 formed in the block providing a well for the receiving of an electrical probe 21.

The water-channeling block 4 and funnel 5 are stabilized on the base support 9 by a hold-down spring 22, and a hold-down bracket 23 secured to a rigid arm 24 fixedly secured to the base support 9.

The electronic probe circuit for actuating the rotary stepping motor 1 is illustrated in FIG. 3, and includes a probe amplifier and trigger 22, a monostable multivibrator 23, and a power amplifier 24 connected in the circuit between the probe 21 and the rotary stepping motor 1.

In the operation of the rain gauge of the present invention, when the water column in the well 20 reaches the level of the electric probe 21, the probe amplifier and trigger circuits 22 detect a current flow between the probe elements to thereby generate a trigger signal which switches the monostable multivibrator 23 into its active mode to thereby produce an output for 40 ms. This output is then amplified and applied to the rotary stepping motor 1 which causes the bucket wheel 2 to advance its position whereby 0.1 ml of water is removed from the bottom of the water column in main bore 18. Simultaneously, the next succeeding bucket is moved to the filling position. Before a bucket reaches the filling position, it is emptied completely into the trough 6 by the outward movement of the piston during one revolution of the wheel as described hereinabove. By employing a 40 ms output signal from the multivibrator, the probe circuit is disabled to prevent false triggering of the gauge while the bucket wheel is advancing. Each 0.1 ml of water removed from the bottom of the water column represents a 0.005 mm increment of rainfall; thus, the output of the multivibrator can be recorded as a hack-mark on a strip chart recorder 25 indicating an increment of rainfall, and by determining the number of increments during a period of time, the rainfall rate is calculated.

From the above description, it will be readily apparent to those skilled in the art that the gauge of the present invention has advantages over conventional tipping-bucket type rain gauges in that its accuracy is determined by physical dimensions, while at the same time, its operation is independent of temperature effects and the impurity content of the collected rain water. Furthermore, the sensitivity of the gauge allows the measurement of rainfall rates in the range of 0.3 mm/h to 33 mm/h which normally would not be detected.

It should be pointed out that while the figures disclose what is at present considered to be the preferred embodiments of the subject invention, this disclosure is made by way of illustration only and is not meant to be interpreted in a limiting sense, since when desirable other modifications and alterations may be resorted to by those skilled in the art without departing from the spirit and scope of the invention as set forth in the following claims. Accordingly,

What is claimed is:

1. A gauge for measuring low-to-moderate rainfall rates comprising, rain water collection means, rotary bucket wheel means having a plurality of peripherally spaced buckets positioned beneath and communicating with said rain water collection means, motor means connected to the bucket wheel means for rotating said bucket wheel means, and electrical means connected between said rain water collection means and said motor means and responsive to the level of the collected rain water, whereby when a predetermined level of water is attained in the collection means the motor means is energized to rotate said bucket wheel means to thereby remove an increment of water from the rain water collection means.

2. A gauge according to claim 1, wherein the rain water collection means comprises, a water-channeling block, a main bore formed in said block for receiving the collected rain water to thereby provide a water column communicating with the rotary bucket wheel means, and a recess formed in said block communicating with said main bore, said recess adapted to receive a water-level sensing component of said electrical means.

3. A gauge according to claim 2, wherein said rotary bucket wheel means comprises, an annular ring, a plurality of radially extending cylinders provided in said ring, and piston means slidably mounted in each cylinder to facilitate the removal of the collected water from the cylinder during the rotary movement of the wheel means.

4. A gauge according to claim 3, wherein said piston means comprises, a piston, a piston rod connected to said piston and extending radially inwardly through the inner peripheral edge of said ring, spring means connected between the piston rod and the inner peripheral edge of said ring for biasing the piston toward the bottom of said cylinder, and cam means positioned at the center of said ring, the inner end of the piston rod being spring-biased against said cam.

5. A gauge according to claim 4, wherein said cam means comprises, a fixed disc cam, the inner end of each piston rod being spring-biased against the peripheral edge of said cam, the development of said cam being such that during each 360° rotation of said wheel each piston is progressively urged radially outwardly from the bottom of its respective cylinder to the top of said cylinder and then returned to the bottom of the cylinder.

6. A gauge according to claim 1, wherein said motor means comprises, a rotary stepping motor, whereby upon energization of said motor each bucket of said wheel means is sequentially positioned beneath said rain water collection means.

7. A gauge according to claim 1, wherein the electrical means for energizing the motor means comprises, a probe positioned in said water collection means and adapted to detect a predetermined level of collected water, an electrical circuit connected between said probe and said motor means, a probe amplifier and trigger, a monostable multivibrator and a power amplifier connected in the circuit between the probe and the motor means, whereby when the water reaches a predetermined level in the water collection means a current flow is established between the probe elements which is detected by the probe amplifier and trigger thereby generating a trigger signal to switch the monostable multivibrator to its active mode, the output of which being amplified and applied to the motor means.

8. A gauge according to claim 7, wherein the output of said monostable multivibrator is produced for 40 ms to thereby disable said probe, whereby false triggering of the gauge is prevented during the rotary movement of the bucket wheel means.

9. A gauge according to claim 7, wherein a strip chart recorder is connected to said multivibrator, whereby the output of the multivibrator is recorded as increments of rainfall.

10. A gauge according to claim 3, wherein the water-channeling block is formed with an arcuate surface conforming to the radius of curvature of said ring means, said arcuate surface and the outer peripheral surface of said ring being contiguous.

11. A gauge according to claim 10, wherein each cylinder sequentially removes 0.1 ml of water from the bottom of the water column during rotation of said wheel means, each 0.1 ml of water representing a 0.005 mm increment of rainfall, whereby rainfall rates in the range of 0.3 mm/h to 33 mm/h may be measured.

* * * * *